UNITED STATES PATENT OFFICE.

JAMES W. GILLIES, OF NEW YORK, N. Y.

IMPROVEMENT IN PROCESSES OF ROASTING COFFEE.

Specification forming part of Letters Patent No. 116,298, dated June 27, 1871.

*To all whom it may concern:*

Be it known that I, JAMES W. GILLIES, of the city, county, and State of New York, have invented a new and useful Improvement in Roasting Coffee; and I do hereby declare that the following is a full, clear, and exact description of the same.

The ordinary process of roasting coffee consists of a single operation, the green or raw coffee being placed in the roaster and subjected to the heat of the fire without intermission until the roasting is completed.

My invention consists in dividing the roasting process into two operations, by the first of which it is roasted only till its color begins to change to a brownish tint; then suspending the operation and allowing it to become thoroughly cool, and afterward subjecting it to a second and final roasting. By this means the flavor of the coffee is very much improved.

The roasting, according to my invention, may be performed in an ordinary coffee-roasting cylinder, heated in the usual way, or in any other suitable roasting apparatus. The degree of heat employed in both the first and second roasting operations may be the same as is used in the ordinary continuous roasting process. The first roasting is continued until the color of the berry begins to change to a brownish tint, when it is immediately withdrawn from the roaster and allowed to cool by exposure to the atmosphere. The second roasting may be performed immediately after the coffee has become cooled to the temperature of the atmosphere, or at any time thereafter, and is continued until the coffee has been completely roasted, which will be known by the same indications as in roasting in the ordinary way.

What I claim as my invention, and desire to secure by Letters Patent, is—

The within-described process of roasting coffee by subjecting it to two roasting operations, with an intervening cooling operation.

JAS. W. GILLIES.

Witnesses:
   H. D. ROBINSON,
   STEPHEN B. BROGEN.